United States Patent [19]

Hanson

[11] 4,287,801

[45] Sep. 8, 1981

[54] DEVICE FOR PERFORATING BAKERY GOODS SUCH AS ENGLISH MUFFINS

[76] Inventor: Douglas R. Hanson, 1720 - 9th Ave. South, Anoka, Minn. 55303

[21] Appl. No.: 118,509

[22] Filed: Feb. 4, 1980

[51] Int. Cl.³ ............................................. B26D 3/30
[52] U.S. Cl. ...................................... 83/871; 83/326; 83/868; 83/874; 225/97
[58] Field of Search .................. 83/871, 867, 868, 874, 83/326; 225/97, 93

[56] References Cited

U.S. PATENT DOCUMENTS

| 3,192,975 | 7/1965 | Noel | 225/93 |
| 3,192,976 | 7/1965 | Clock | 83/871 |
| 3,733,942 | 5/1973 | Noel | 83/868 |
| 4,159,662 | 7/1979 | Weaver | 225/97 X |

Primary Examiner—Frank T. Yost
Attorney, Agent, or Firm—Kinney, Lange, Braddock, Westman and Fairbairn

[57] ABSTRACT

A device for perforating the edges of individual bakery products to facilitate the separation of the products into portions.

10 Claims, 9 Drawing Figures

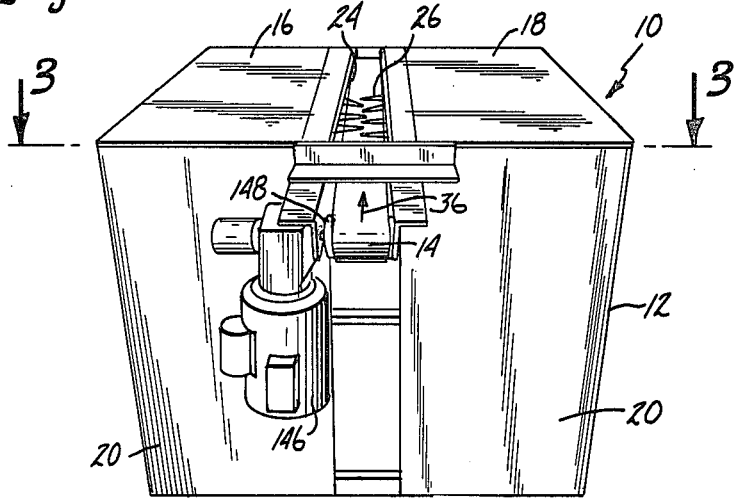
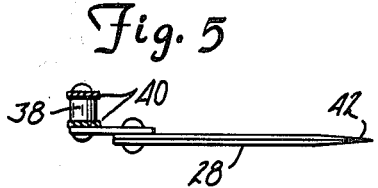
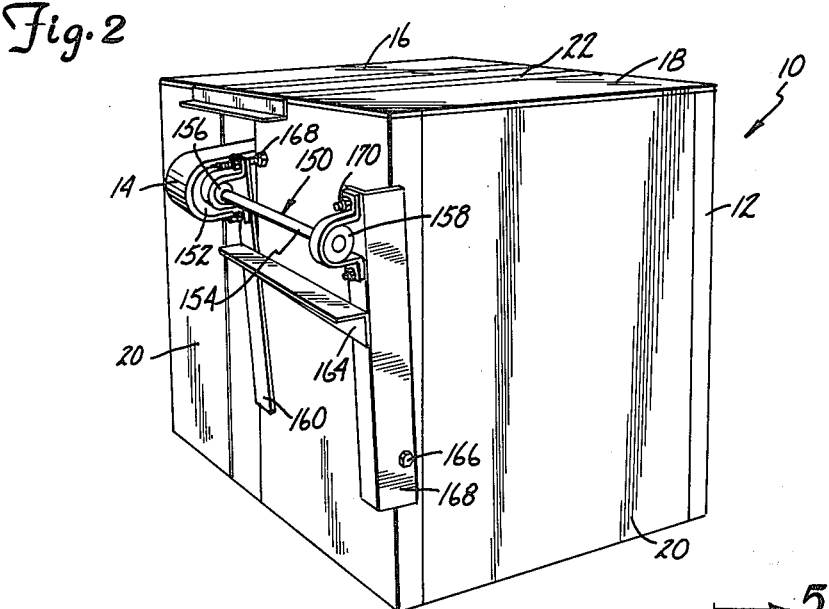
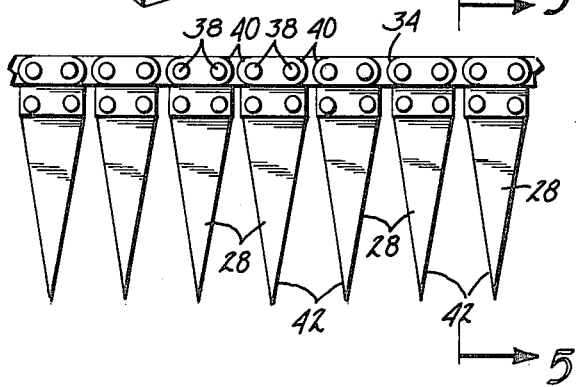

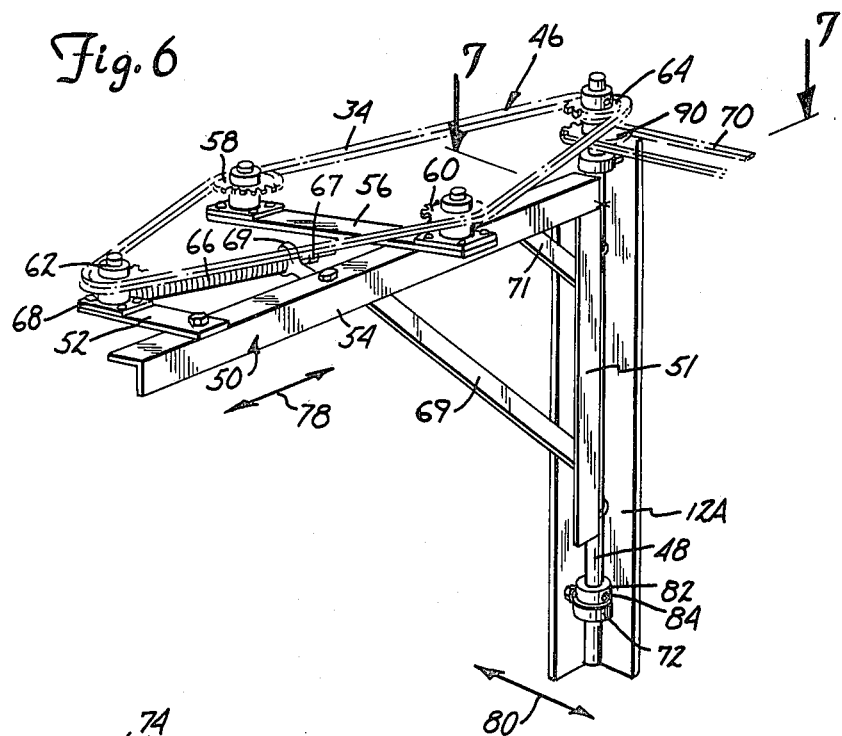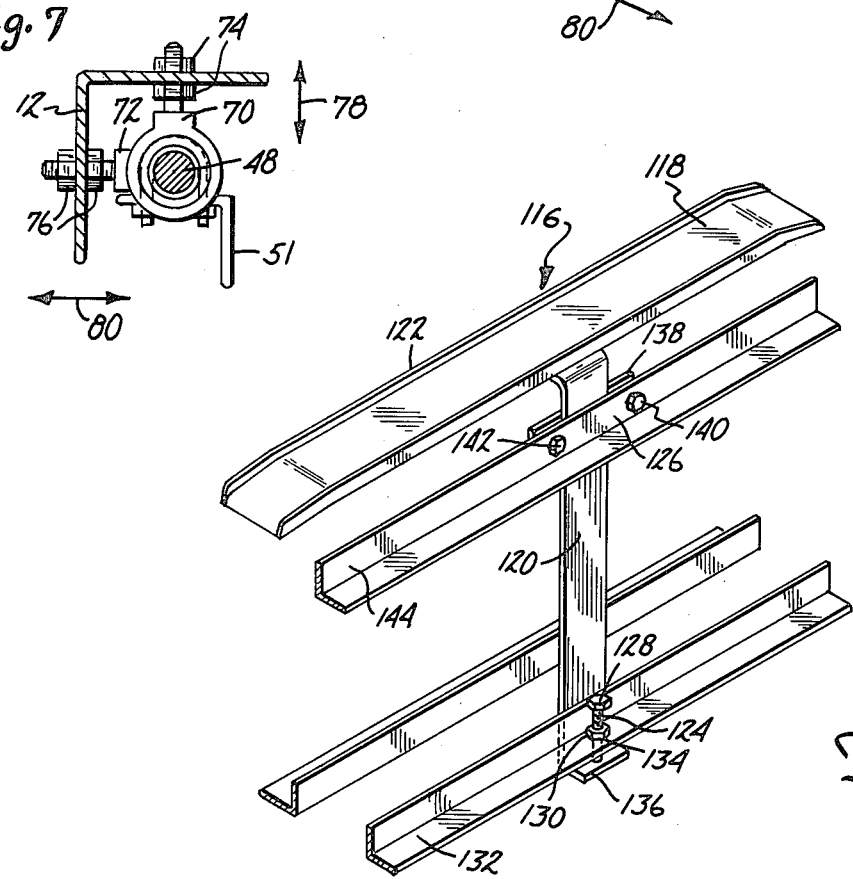

DEVICE FOR PERFORATING BAKERY GOODS SUCH AS ENGLISH MUFFINS

BACKGROUND OF THE INVENTION

1. Field of the Invention

The present invention relates to devices that produce a series of perforations in pieces of bakery goods for the purpose of easily separating the bakery goods into portions. In particular, the present invention relates to devices that produce such perforations in a continuous manner to a continuous stream of individual pieces of bakery goods.

2. Description of the Prior Art

Bakery goods or products such as English muffins are normally separated into two portions or halves by the consumer for the purpose of spreading butter, margarine, jam or the like on the inside surface. An English muffin is not easily separable and if torn apart by hand, produces quite a mess. Normally a knife is used to cut the English muffin, but a fair amount of skill and dexterity is needed due to the relative thinness and large width of an English muffin. For these reasons, consumers prefer to have their English muffins partially slit or perforated so that the English muffin may easily be torn apart.

In the prior art, two common methods of tearing open an English muffin include the use of a knife, as mentioned previously, by a single consumer enjoying a single English muffin or the use of a band saw type blade by the baker producing a quantity of English muffins. The band saw method may be used to either completely cut the English muffin into two sections, keeping the two sections together until the muffin is ready to be eaten, or to produce a slit allowing the consumer to tear the remainder of the muffin open. The slit is preferable since it makes use of the traditional method of eating an English muffin. From a consumer standpoint, however, a rough texture of the separated English muffin halves is greatly preferred to a sliced surface. Partial perforations or slicing makes it possible to tear open the muffin and still have a rough texture.

SUMMARY OF THE INVENTION

The present invention includes a device for producing a series of transverse perforations or slices around the edges and into the body of individual pieces of bakery goods or products such as English muffins in such a manner that the product is easily separated by the consumer into discrete portions. The device comprises a substantially horizontal belt movable on a rigid frame transporting the pieces of bakery goods in a continuous stream. First and second sets of perforating blades with pointed ends are mounted on separate endless drive chains situated above and on opposite sides of the horizontal belt. The sets of blades are powered so that the blades move in the same direction as the belt along a portion of the belt's travel. The first and second set of blades are also situated such that the pointed ends of the blades of each set face each other and extend partially across the belt. The first set of perforating blades moves at a slower lineal speed than the horizontal belt and the second set of perforating blades moves at a faster speed than the horizontal belt. The path followed by the blades converges in the direction of travel of the belt so the blades move into the product as they move. The blade path then diverges, causing the blades to withdraw from the product.

In addition, the first and second sets of perforating blades oscillate horizontally, transverse to the horizontal belt, in opposed reciprocating motion relative to each other.

The bakery goods, such as English muffins, are placed on the horizontal belt in sequence and are transported by the belt for perforation by the blades. The vertical spacial relationship between the first and second sets of perforating blades and the horizontal belt is set in such a manner that the edges of the bakery goods will be pierced and perforated into top and bottom halves. The bakery goods, upon reaching the appropriate position, are pierced simultaneously from opposite sides as the sets of blades move toward each other and also reciprocate. The differential in speed between the first set of perforating blades and the horizontal belt and the second set of perforating blades turns the bakery goods while on the horizontal belt such that the product is pierced along its entire periphery. In this manner, perforations or partial slices extending into the bakery goods are produced in a continuous, efficient manner at a high rate.

BRIEF DESCRIPTION OF THE DRAWINGS

FIG. 1 is a perspective view of the device of the present invention;

FIG. 2 is a perspective view of the device of the present invention from an opposite end thereof from FIG. 1;

FIG. 4 is a fragmentary top view of perforating blades used with the device of the present invention;

FIG. 5 is a side view of a perforating blade taken along the line 5—5 in FIG. 4;

FIG. 6 is a perspective view of a blade support assembly of the present invention;

FIG. 7 is a cross sectional view taken along line 7—7 in FIG. 6 with the horizontal framework eliminated for clarity;

FIG. 8 is a perspective view of the belt support assembly of the present invention.

DESCRIPTION OF THE PREFERRED EMBODIMENT

Figure 3:
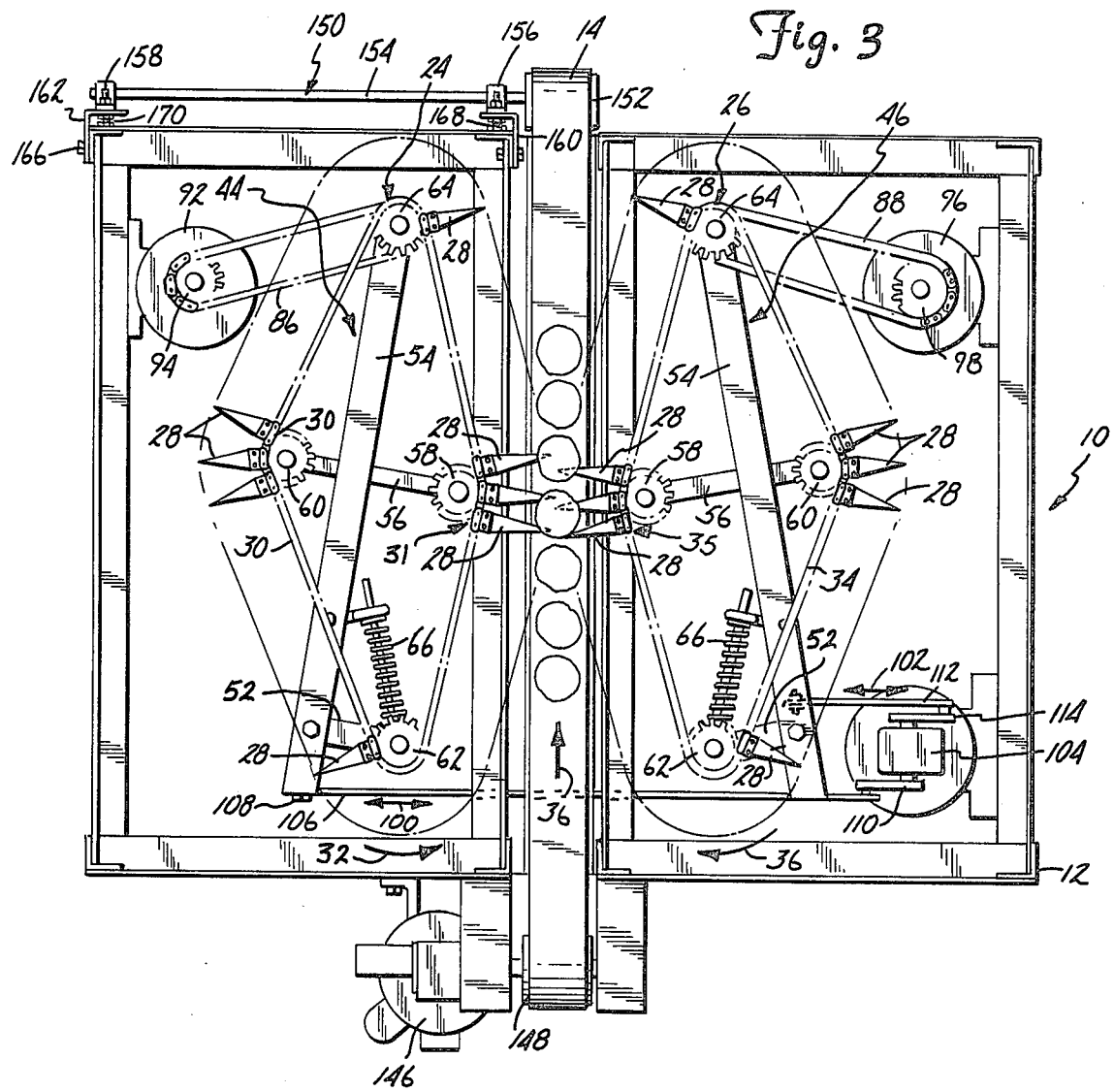
FIG. 3 is a top view of the device of FIG. 1 with parts broken away to show the operating apparatus.

FIGS. 1 and 2 show the device of the present invention used for perforating bakery goods and indicated at 10. The device has a rigid frame 12 and a substantially horizontal conveyor belt 14 movably attached to the frame and on which bakery goods, such as English muffins, are placed and moved through the device of the present invention 10. Top panels 16 and 18 and side panels 20 are attached to the frame 12 and form the exterior enclosure or cabinet of the present invention. The bakery goods are perforated by a first set of perforating blades 24, and a second set of perforating blades 26 in such a manner that each piece is perforated along its entire periphery. The perforations enable the consumer to easily tear apart bakery goods into two halves. The device provides an efficient and economical method for producing perforations in bakery goods. The bakery goods will specifically be referred to as English muffins in this description.

FIG. 3 shows a preferred manner in which the mechanical components of the device of the present invention are interrelated, from a top view with the top panels 16 and 18 removed. The first set 24 of perforating blades has a plurality of individual perforating or slicing blades 28 attached to links of a roller chain 30 and thus positioned adjacent to each other. Most of the blades 28 are not shown but in fact there is a blade attached to each link of the chain throughout its entire length in an adjacent continuous manner. The chain 30 is driven in a closed, diamond shaped path and the first set 24 of perforating blades preferably moves in a counterclockwise manner as shown by arrow 32.

The portion 31 of the path of the chain 30 (in the center of the diamond shape) nearest the horizontal belt 14 moves in substantially the same horizontal direction as the belt 14, and portion 31 of the chain path is positioned alongside, and above the plane of, belt 14. The portion 31 of the path is preferably positioned a distance above the belt 14 corresponding substantially to the vertical midpoint of the English muffins on the belt 14. As shown the blades 28 move to position overlying the belt 14 at chain path portion 31.

The second set 26 of perforating blades is positioned on the opposite side of the horizontal belt 14 of the first set 24 of perforating blades and is substantially a mirror image of the first set 24 of perforating blades. The second set 26 of perforating blades is also shown with most of the blades 28 removed for clarity. The second set 26 of perforating blades also has blades 28 fixedly attached to a second endless roller chain 34 which is driven in a closed, diamond shaped path, as shown, and which transports the blades 28 in a clockwise direction as indicated by arrow 36. The path of the second chain 34 has a portion 35 that passes close to the belt 14 positioned in such a manner that the outer ends of blades 28 attached to the chain in this portion of the chain path overlie the belt 14. The chain in the path portion 35 is also preferably positioned above the belt 14 the same distance as the chain in path portion 31, which corresponds substantially to the vertical midpoint of the English muffin on the belt 14. The chain 34 in path portion 35 moves in substantially the same direction as the horizontal belt 14, as does the chain 30 in path portion 31.

FIG. 4 shows in more detail the perforating blades 28, as typically attached to a chain, which is chain 34. The chain 34 is a continuous link roller chain having pins 38 holding links 40 together. The perforating blades 28 are fixedly attached to flanges on the links of the chain 34, such as with rivets. The blades 28 are preferably flat and triangular and converge to a sharp pointed end portion 42, as shown in FIGS. 4 and 5. The side edges of blades 28 are also sharpened. FIG. 4 shows that the blades 28 converge from a wide portion nearest the chain 34 to the pointed end 42. The pointed ends 42 of the blades 28 on the chains 30 and 34 face each other as shown in FIG. 3 when the blades are adjacent the belt and in chain path portions 31 or 35, respectively.

The first and second sets 24,26 of perforating blades, including chains 30,34, are mounted to a first blade support assembly and a second blade support assembly generally indicated at 44,46, respectively, in FIG. 3. The first blade support assembly 44 and the second blade support assembly 46 have similar components and the same reference numerals will be used to describe those similar components. FIG. 6 shows a second blade support assembly generally indicated at 46. The second blade support assembly 46 preferably includes a substantially vertical shaft 48 pivotally attached to one upright frame member 12A of frame 12 as will be shown. A framework 50 has a vertical member 51 attached to the vertical shaft 48 with clamps, such as "U" bolts so that the framework 50 pivots with the shaft 48. The framework 50 has a main substantially horizontal frame member 54 which is rigidly attached to and cantilevered from upright member 51.

The support for the chain 34 (and also chain 30) includes a pair of idler sprockets 58 and 60 rotatably mounted on opposite ends of a support 56 which is fixed to support 54. The idler sprockets guide the path of the chains in the center portions of the chains, where the chain path is adjacent to the belt 14. The ends of each chain, are mounted on a drive sprocket 64, which is rotatably mounted on the upper end of shaft 48, and is part of a double sprocket drive and on an outer end idler sprocket 62. Each idler sprocket 62 is rotatably mounted on an arm 52 that is pivoted to support member 54 adjacent the outer end of member 54. Sprockets 58, 60, 62 and 64 are in substantially the same horizontal plane and rotate about parallel axes. The sprockets are arranged to establish a generally diamond shaped path for the chains. The chain 34 to which the blades 28 (not shown in FIG. 6) are attached is mounted over the sprockets 58, 60, 62 and 64, respectively. Tension on the chains is preferably kept by spring 66 mounted on a control rod 67 which is slidably mounted in a support 69 at one end and attached to the free end 68 of arm 52 at the other end. The compression spring acts between support 69 and the arm 52 to urge the arm about its pivot to place tension in the chain. The support member 54 is braced back to member 51 with braces 69 and 71.

The upper end of shaft 48, and thus the respective blade support assembly, is pivotally attached to the frame member 12A by first spherical seat rod end bearing 70, the lower end is supported with a second rod end bearing 72 as shown in both FIGS. 6 and 7. As shown in FIG. 6, the housing for first bearing 70 has a stud that passes through a first leg of angle iron frame member 12A. The stud is held in place with a pair of nuts 74, one on each side of the first leg of frame member 12A. The second bearing 72 is attached to a second leg of frame member 12A and has a stud which passes through an opening in the second leg and is held in place with a pair of nuts 76, one on each side of the second leg. The axis of the studs holding the first and second bearings 70,72 are at 90° and by adjusting the axial position of the nuts, the second blade support assembly may be adjusted in two different directions. Adjusting the nuts 74 allows the top of shaft 48 and thus the top portion of the second blade support assembly to be moved in the direction of arrow 78, which pivots the second blade support assembly about the second bearing 72 thereby allowing the second blade support assembly to be tilted in a first vertical plane. Adjusting the nuts 76 allows the bottom portion of shaft 48 and the second blade support assembly to be moved in the direction of arrow 80 which pivots the second blade support assembly about the first bearing 70 thereby allowing the second blade support assembly to be tilted in a vertical plane perpendicular to the first plane.

A collar 82 is attached to the shaft 48 by set screw 84 and provides for vertical adjustment of the second blade support assembly. The collar 82 bears against lower bearing 72. When the set screw 84 is loosened, the second blade support assembly can be adjusted to the height desired by moving the shaft 48 through the collar 82. This set screw 84 is then tightened and the collar is rested on the top surface of the second bearing 72, securely setting the height of the second blade support assembly.

Adjusting the second blade support assembly in the three different directions described previously above will permit adjusting the piercing blades 28 spacially with respect to the bakery goods which are being transported on the horizontal belt 14. The first blade support assembly carrying chain 30 has all the components as described in the second blade support assembly and is adjustable in all three directions in a similar manner.

Referring back to FIG. 3, the chains 30,34 of the first and second blade support assemblies are driven by sprockets 64. The sprockets 64 are part of double sprocket assemblies which include a lower sprocket 90 as best seen in FIG. 6. The sprockets 90 are driven by chains 86 and 88, respectively. The double sprocket assemblies having sprockets 64 and 90 are rotatably mounted on shafts 48.

The chain 86 is in turn driven by a first motor 92 through a sprocket 94 as best seen in FIG. 3. Chain 88 is similarly driven by second motor 96 through a sprocket 98. The sprocket 94 is smaller than the sprocket 98, thereby driving the chain 86 at a slower speed than the chain 88. Thus the chain 30 and the attached piercing blades 28 move at a slower speed than the chain 34 and its attached piercing blades 28. Further, the sprocket 94 is of size so that the blades 28 attached to the chain 30 are driven at a slower lineal speed than the speed of movement of horizontal belt 14. The diameter of the sprocket 98 is such that the blades attached to the chain 34 are driven at a lineal speed greater than the horizontal belt 14. In one preferred embodiment, the chain 30 of the first blade support assembly was driven at a lineal speed that was about 10% slower than the speed of the horizontal belt 14 and the chain 34 was propelled at a speed that was about 20% faster than the speed of the horizontal belt 14. The differential in speed between the first chain 30 and the horizontal belt 14 and the second chain 34 will, as will become apparent, resolve the bakery goods (muffins) which are being transported by the belt 14 upon contact with the blades 28. in the embodiment described above with the 10% and 20% speed differential, the bakery goods were rotated approximately 90° and separated while engaged by blades 28 of the two knife sets and while moving along horizontally with the horizontal belt 14.

The outer ends of first and second blade support assemblies 44,46 are also oscillated transversely and horizontally about the axes of shafts 48 with respect to the longitudinal axis of the belt 14 as shown by arrows 100 and 102, respectively, in FIG. 3. An oscillating motor-gear reducer unit 104 provides the oscillating power for both the first and the second blade support assemblies 44,46. The first blade support assembly 44 is driven by motor-gear reducer 104 through first connecting link 106 which has one end pivotally attached to the free or outer end 108 of the main horizontal member 54 of the framework 50 of assembly 44. The other end of the link 106 is rotatably attached to a crank 110 which is driven by one end of the output shaft of the motor-gear reducer 104. The second blade support assembly 46 is oscillated about the axis of its support shaft 48 through a connecting link 112 which has one end pivotally attached to the main member 54 of the framework 50 of the second support assembly 46. The other end of the link 112 is rotatably attached to a second crank 114 which is mounted on and driven by an opposite end of the output shaft of motor-gear reducer 104. Both the first and the second blade support assemblies pivot on the respective first and second bearings 70,72 which were described previously.

The drive pin of the first crank 110 is 180° out of phase with the drive pin of the crank 114. The opposing phase of the crank pins causes the first and second blade support assemblies 44,46 to oscillate toward each other and then away from each other. As the support assemblies move toward each other the English muffins are pierced with the piercing blades 28. The opposing movement further provides counterbalance of the forces being produced by the oscillation. In one embodiment of the present invention, the first and second blade support assemblies 44,46 were oscillated up to 725 times per minute with a three-quarter inch stroke without producing substantial vibration on the device of the present invention.

The horizontal belt 14 is preferably supported by belt support assembly 116, as shown in FIG. 8. The belt support assembly 116 includes a horizontal main support track 118 which is fixedly attached to a vertical bar 120. The main support track 118 directly supports the upper reach or length of the horizontal belt 14 for sliding movement and has guide lips 122 which insure that the horizontal belt 14 stays on course. More importantly, the belt support assembly 116 is used to adjust the height of the upper length of horizontal belt 14 thereby adjusting the vertical relationship of the bakery goods or products carried on the belt with respect to the piercing blades 28. The assembly 116 is supported relative to a pair of frame members 132 and 144 which form part of frame 12. The height of the horizontal belt 14 is preferably adjusted by an upwardly stop assembly 124 on frame member 132 and a clamp bracket 126 on frame member 144. The stop assembly simply includes a stop bolt 128 extending through a nut 134 welded to frame member 134. The end of the bolt 128 also passes through an aperture in the frame member 132 and bears against a horizontal flange 136 formed at the end of the vertical bar 120. A lock nut may be used to insure that the stop bolt 128 will not move once it is set. The clamp bracket 126 includes a clamp plate 138 and bolts 140,142. The bolts 140,142 pass through apertures in frame member 144 and further pass through respective apertures in the clamp plate 138. Nuts are used on bolts 140,142 for providing clamping force. When the bolts 140 and 142 are loosened, the height of the belt support assembly may be adjusted as limited by stop bolt 128, which also can be adjusted as desired.

When the stop bolt 128 is set, the member 120 is pulled up until leg 136 is stopped by the end of bolt 136. This position is the desired height of the belt support assembly and in turn the desired height of the upper length of horizontal belt 14. The bracket 126 is then clamped onto member 120 by tightening bolts 140 and 142 with their respective nuts.

The horizontal belt or conveyor 14 is driven by a belt drive motor-gear reducer 146 as shown in FIG. 3. The horizontal belt is driven by drive pulley 148 which in turn is mounted directly on the output shaft of the belt drive motor-gear reducer 146. The belt drive motor-gear reducer is mounted directly to the frame 12. The horizontal belt 14 is an endless belt also mounted over a pulley 152 that is mounted on a shaft 154 forming part of a belt tension adjustment assembly 150 as shown in FIGS. 2 and 3. The tension adjustment assembly includes a frame that comprises a pair of pivoting upright members 160,162 held together with a cross brace 164. The support shaft 154 is rotatably supported in first and second support bearings 156,158 that are mounted on members 160,162, respectively.

The tension adjustment assembly is pivotally attached to the frame 12 with suitable pivot pins, for example pin 166 shown in FIG. 2. Stop bolts 168 and 170 may be used to adjust the tension in belt 14. The heads of the bolts bear against the frame 12 and nuts can be used on the bolts for adjusting the amount the bolts extend outwardly from the members 160,162. The bolts 168,170, respectively, also can be used for holding the respective bearings 156,158.

Figure 9:
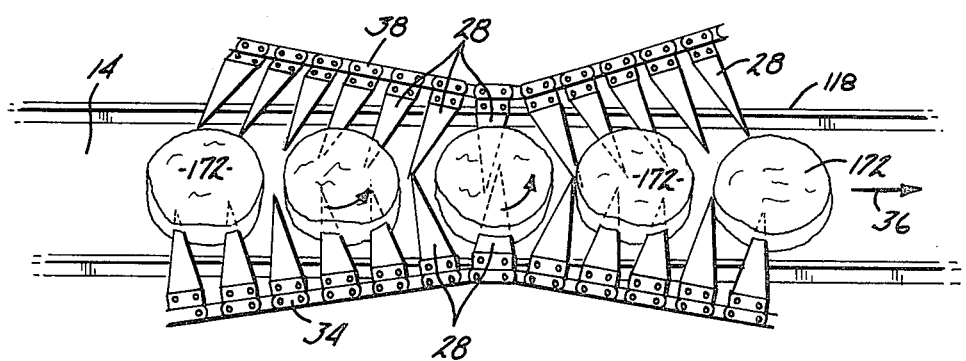
FIG. 9 is a fragmentary top view showing bakery goods being pierced by the present invention.

In operation, English muffins 172 as shown in FIG. 9, are fed onto the horizontal belt 14 at the end driven by the belt motor 146, as shown in FIG. 3, in a continuous manner. The English muffins 172 are transported by the upper reach or length of the horizontal belt 14 in direction as indicated by arrow 36. The chains 30 and 34 are also being driven and the blades 28 on opposite sides of the belt are moving in the same direction and are converging. As the blades start to engage the English muffins are rotated on the belt due to the differentials in speed between the chain 30, the belt 14 and the second chain 34, as described previously above. As the English muffins are turned, they are pierced by the blades 28 due to the converging of the blades as they move along the belt and also because of the oscillation of the first and second blade support assemblies. Note that the ends of the support assemblies connected to the links 106 and 112 are at the lead end of the machine. The rotation of the English muffins causes the piercing blades 28 to pierce the English muffins around their entire periphery.

The midportion of the path of travel of the chains shown at portions 31 and 35, as guided by sprockets 58 is where the blades are the closest together and almost meet. The chains 30,34 and the attached blades then diverge and as the muffins are moved by the belt, the blades are completely withdrawn from the muffin. The muffins are carried by belt 14 to the outer end and dropped onto a further conveyor for further processing. In this manner, the English muffins are pierced into essentially two halves so that the consumer may easily tear open the muffin into two portions for consumption. The two halves are not completely severed by the blades, however.

The speed of operation of the device of the present invention in piercing bakery goods such as English muffins is high. In one embodiment of the present invention, at a speed of belt 14 of 115 feet per minute, 600 muffins a minute were processed through the device.

The transverse oscillation of the blades 28 keeps the muffins from sticking to a blade and also provides a short, slicing stroke for ease of making the cut. The muffin halves remain together for packaging, yet tear easily while retaining a rough texture on the separated surfaces.

Although the present invention has been described with reference to preferred embodiments, workers skilled in the art will recognize the changes that may be made in form and detail without departing from the spirit and scope of the invention. For example, although the present invention has been described with specific belt adjustment assemblies and blade adjustment methods, other types of assemblies and methods may be used in adjusting the spacial relationship of the piercing blades and the belt with respect to the bakery goods without departing from the scope of the present invention.

What is claimed is:

1. A device for perforating the edges of individual bakery products to facilitate the separation of the products into portions comprising:
   a rigid frame;
   conveyor means mounted on said frame and adapted to move products in sequence along a path of movement in a first direction;
   at least one set of perforating blades, said blades having outer ends;
   means to mount said set of blades for sequential movement of the blades in a blade path having a portion adjacent to and parallel to the conveyor means, said blades in said path portion moving in said first direction;
   said means mounting said blades guiding said blades from a first position to a second position in direction transverse to the first direction whereby the outer ends of the blades move toward and engage products on the conveyor means as the products and blades move in said first direction and the blades are in said path portion;
   means to provide reactive force on products on the conveyor means as the blades engage the products sufficient so the blades pierce the products as the blades move from said first to said second position along said path portion; and
   means to oscillate said at least one set of perforating blades in direction transverse to said first direction as said blades move from said first to said second position.

2. The combination as specified in claim 1 wherein said means to provide reactive force comprises:
   a second set of perforating blades positioned on a opposite side of products carried on said conveyor means from the first set of blades and forming a substantially mirror image of the at least one set of perforating blades whereby products on said conveyor are engaged by both said at least one set of perforating blades and said second set of perforating blades from opposite directions and substantially simultaneously.

3. The combination as specified in claim 1 wherein said means mounting said blade further guides said blades in a second path portion which moves the blades away from products on said conveyor means subsequent to the movement of said blades through the first mentioned path portion.

4. The combination as specified in claim 1 wherein said at least one set of perforating blades comprises:
   an endless flexible member moving in a closed path;
   individual blades mounted on said endless flexible member and;
   means to power said endless flexible member to move in said closed path.

5. The combination as specified in claim 4 wherein said closed path of said endless member mounting said blades defines a diamond shape when viewed in direction generally perpendicular to the conveyor means in its path of movement where the conveyor means is adapted to carry a bakery product, said path portion comprising the midportion of one side of said diamond shaped closed path.

6. A device for perforating the edges of individual bakery products to facilitate the separation of the products into portions comprising:
- a rigid frame, means mounted on said frame having a generally planar portion adapted to support products in sequence for movement along a path of movement in a first direction;
- first and second sets of perforating blades, each set comprising a plurality of individual blades mounted for movement in a closed path;
- each of said blades having sharpened outer ends, means to mount said sets of blades for sequential movement of the blades in separate blade paths on opposite sides of and adjacent to and parallel to the planar portion, the blades in said separate path portions moving in said first direction;
- said means mounting said blades guiding the blades in each set from a first position to a second position in direction transverse to the first direction whereby the outer ends of the blades of the sets converge and thereby move toward and engage products supported on the planar portion as the products and the blades of each set move in said first direction and the blades are in said separate path portions;
- said blades moving into and piercing the side portions of products on the planar portion as the blades move from the first to the second portions,;
- means to withdraw the blades from the pierced products upon further movement of the products and blades in the first direction beyond the second position of the blades; and
- means to oscillate both sets of blades in direction transverse to said first direction as said blades move from said first to said second positions.

7. The device of claim 6 and further including:
- means to drive the first and second sets of blades in said separate path portions at different speeds from one another.

8. A device for perforating individual pieces of bakery goods such as English muffins to facilitate the separation of the pieces of bakery goods into portions comprising:
- a rigid frame;
- a bakery goods conveyor means movably mounted on said frame and having a generally horizontal section for transporting the bakery goods in a first direction;
- a first set of perforating blades with sharpened ends pointing towards the conveyor means and situated above and alongside the horizontal section of the conveyor means;
- said first set of perforating blades being movably mounted on the frame with a portion of the perforating blades moving in the first direction adjacent the horizontal section of the conveyor means;
- a second set of perforating blades with sharpened ends pointing towards the conveyor means and situated above and alongside the horizontal section of the conveyor means on an opposite side of the conveyor means from the first set of perforating blades;
- said second set of perforating blades being movably mounted on the frame with a portion of the perforating blades moving in the first direction adjacent the horizontal section of the conveyor means at a greater speed than the conveyor means, the first and second sets of perforating blades converging as they move in the first direction from a first position wherein the sharpened ends of the blades are spaced laterally from bakery goods being carried on the horizontal section of the conveyor means to a second position where the blades pierce and enter the sides of the bakery goods as the blades and conveyor means move in the first direction;
- the differences in speed between the first set of perforating blades, the second set of perforating blades and the conveyor means, causing the bakery goods to be rotated about a generally vertical axis as the bakery goods are moved along the horizontal section of the conveyor means, and said first and second sets of perforating blades moving laterally away from bakery goods on the conveyor means subsequent to movement of the blades to their second position.

9. The device of claim 8 wherein the first and second set of perforating blades are movably attached to the frame by a first and second blade set support assembly, respectively, and means to reciprocate at least portions of the first and second sets of perforating blades transversely to the first direction.

10. The device of claim 9 wherein said support assemblies are elongated in said first direction, means to pivotally mount the support assemblies about generally upright axes at first ends thereof, said means to pivotally mount being spaced in the first direction from the second position of the first and second sets of perforating blades, said means to reciprocate causing said support assemblies to reciprocate about said upright axes.

* * * * *